United States Patent [19]
Schram

[11] Patent Number: 5,938,877
[45] Date of Patent: Aug. 17, 1999

[54] METHOD AND SYSTEM FOR MANUFACTURING CUSHIONS FILLED WITH AIR

[76] Inventor: Hendrik Schram, Zuideinde 161 NL-1551 EE, Westzaan, Netherlands

[21] Appl. No.: 08/894,536
[22] PCT Filed: Feb. 22, 1996
[86] PCT No.: PCT/NL96/00086
  § 371 Date: Dec. 5, 1997
  § 102(e) Date: Dec. 5, 1997
[87] PCT Pub. No.: WO96/26137
  PCT Pub. Date: Aug. 29, 1996
[51] Int. Cl.[6] .................................................. A63B 39/00
[52] U.S. Cl. ............................ 156/145; 156/147; 53/403
[58] Field of Search .............................. 156/87, 145, 147, 156/296, 423, 513; 53/403, 101, 546; 493/189, 302, 308, 312, 931; 226/62, 67, 158

[56] References Cited

U.S. PATENT DOCUMENTS 4,169,344  10/1979  Ganz et al. .............................. 53/546
4,564,407   1/1986  Tsuruta .................................... 156/147

FOREIGN PATENT DOCUMENTS 8603163  6/1986  WIPO .
9112175  8/1991  WIPO .
9407678  4/1994  WIPO .

Primary Examiner—Michael W. Ball
Assistant Examiner—Shawn A. Mitchell
Attorney, Agent, or Firm—Webb, Ziesenheim, Logsdon, Orkin & Hanson, P.C.

[57] ABSTRACT

A method and device for manufacturing one or more cushions filled with air from a piece of material having a tube form, wherein a piston member is placed into the tube form, a hole is pierced in the tube form, the piston member is moved whereby the tube form is carried along therewith and one or more weld seams are arranged in the tube form.

10 Claims, 3 Drawing Sheets

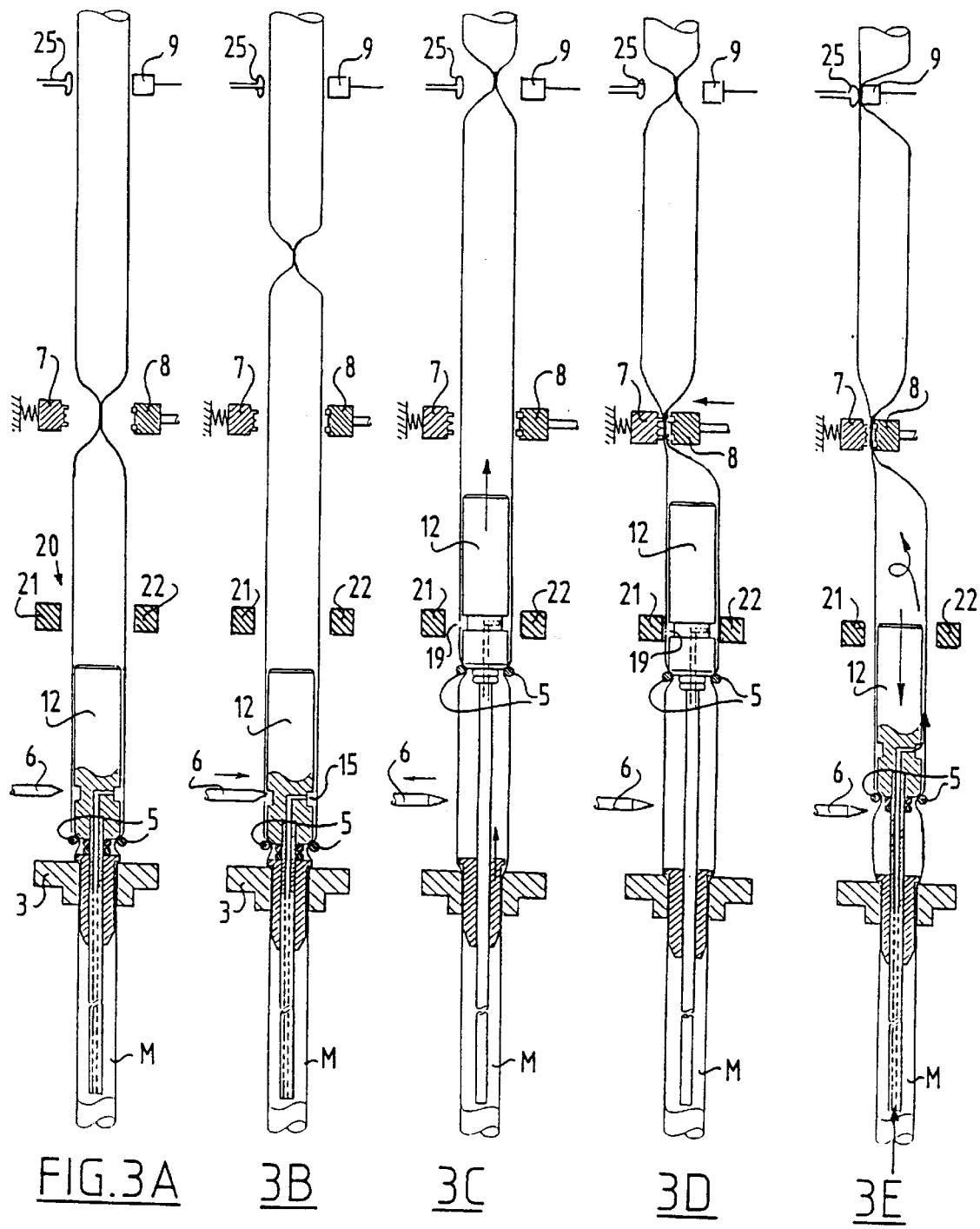

METHOD AND SYSTEM FOR MANUFACTURING CUSHIONS FILLED WITH AIR

BACKGROUND OF THE INVENTION

From an environmental viewpoint and cost considerations associated therewith, there are a growing number of objections to the use of chips of plastic material and shredded paper as filling material in packagings.

Known from the international applications WO94/07678 and WO91/12175 are methods and devices for filling with air small cushions which, individually or as a mutually adhered series, can be used as filling material. After use the volume of these cushions can be reduced and the plastic material removed, for instance to be re-used.

A problem of this known device and method relates to the arranging of holes in sufficiently reliable manner in a tubular foil from which the cushions are made. It has been found in practice that many formed air cushions do not have a sufficient air filling, for example because during piercing of a hole two holes are pierced in the tube form, wherein the air will escape through the second hole. Furthermore, with the known device and method equipment is required for injecting air under pressure.

SUMMARY OF THE INVENTION

The present invention provides a method for manufacturing one or more cushions filled with air from a piece of material having a tube form, wherein a piston member is placed into the material, a hole is pierced in the material, the piston member and the material are moved and one or more weld seams are arranged in the material.

The present invention further provides a device for manufacturing one or more cushions filled with air from a piece of material having a tube form, comprising:

a piston member which is placed into the tube form;

piercing means for piercing one or more holes in the tube form;

moving means which engage on the piston member and cause the piston member to move together with the tube form; and welding means for arranging one or more weld seams in the tube form.

Further advantages, features and details of the present invention will become apparent in the light of the following description and associated drawings.

BRIEF DESCRIPTION OF THE DRAWINGS

FIGS. 3A–3E show schematic views of respective operative positions of the device shown in FIG. 1.

DESCRIPTION OF THE PREFERRED EMBODIMENT

Figure 1:
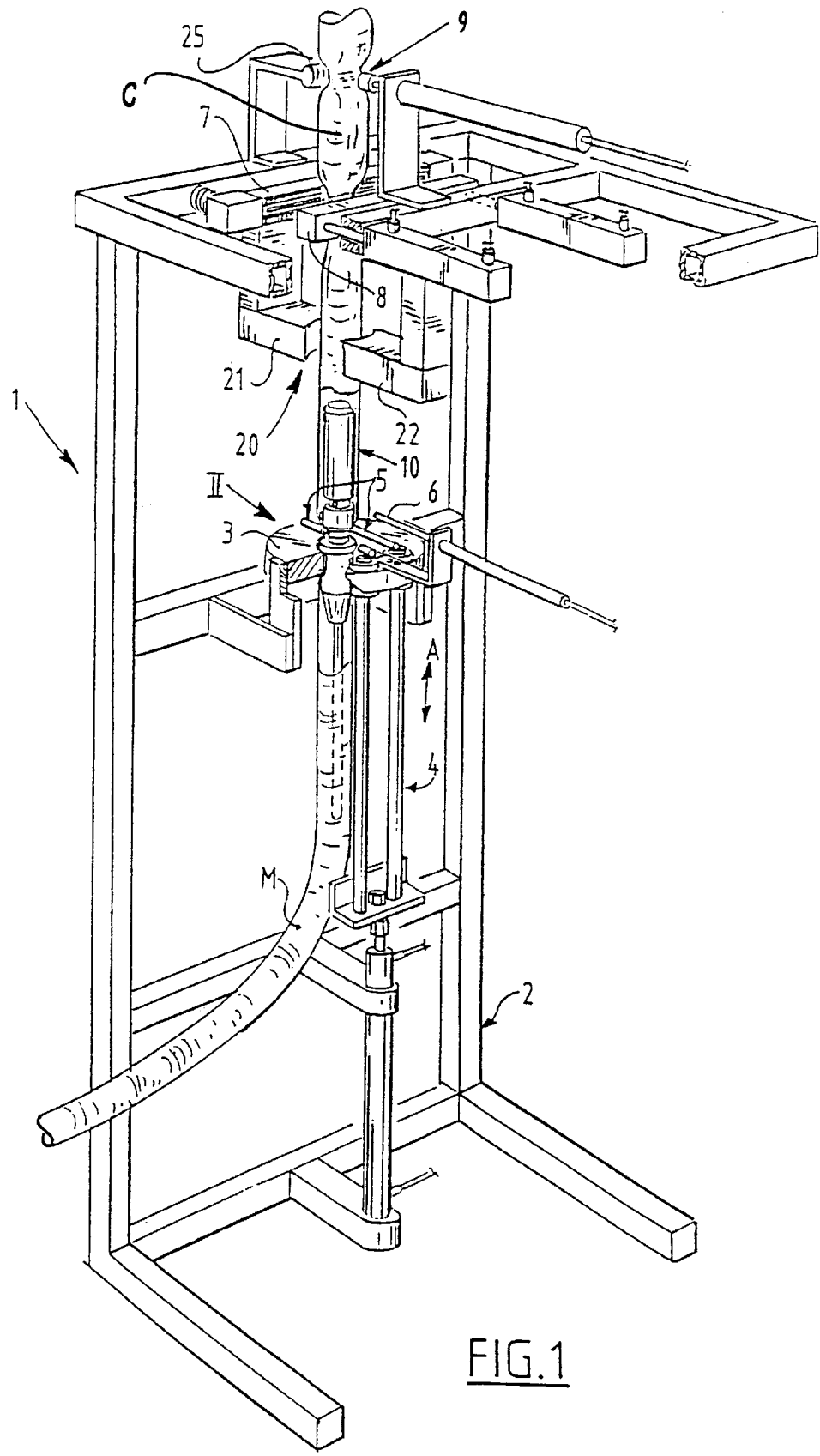
FIG. 1 shows a partially broken away view in perspective of a first preferred embodiment of the present invention.

A preferred embodiment of a device 1 according to the present invention comprises a frame 2 to which is fixed an annular plate 3. Further fixed to frame 2 is a lifting device 4 which serves to lift and lower a fork-like member 5. A piercing member 6, welding members 7 and 8 respectively, clamping means 20 and holding means 9, 25 are further arranged on frame 2.

Figure 2:
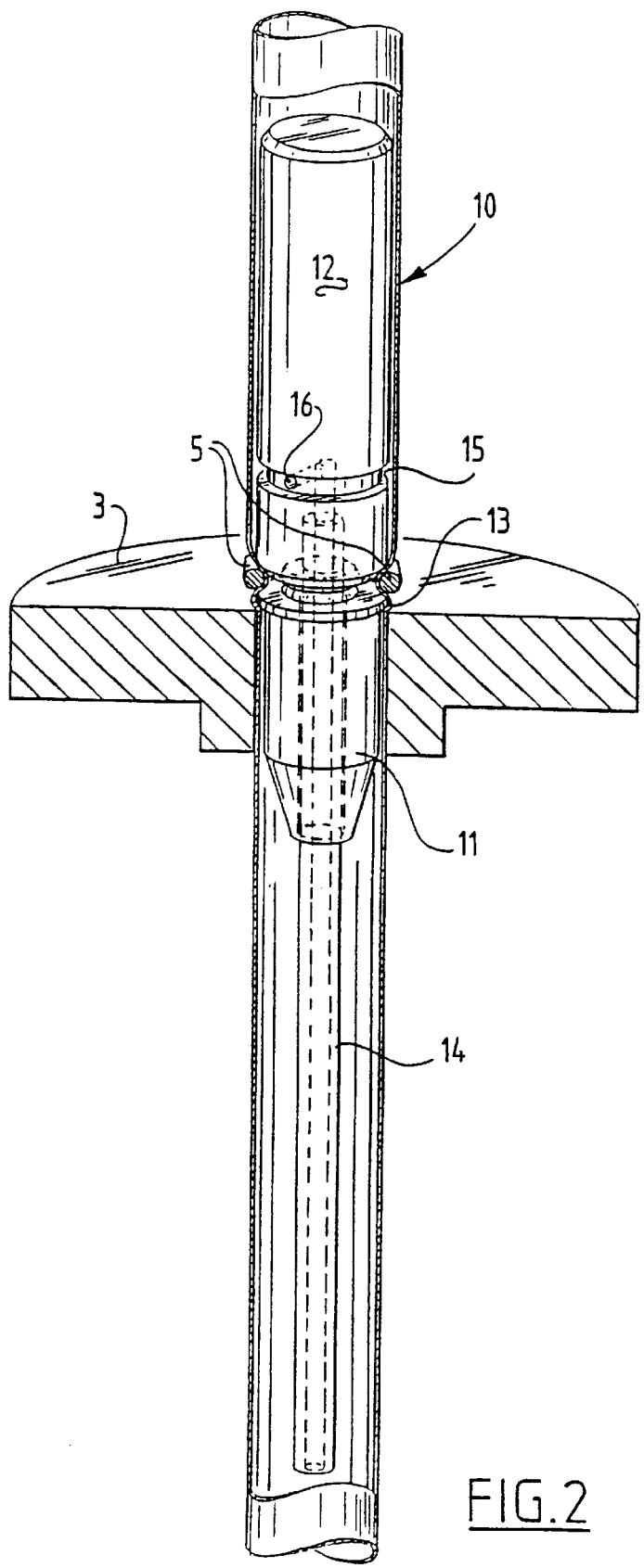
FIG. 2 shows an enlarged view of detail II of FIG. 1.

In the method according to the present invention a piston member 10 comprising a stationary part 11 (FIG. 2) and a movable plunger part 12 is first of all inserted into a piece of tubular material M. The stationary part 11 is provided with a shoulder 13 which rests on the edge of the central opening in the annular plate 3. The stationary part 11 is also provided with a central bore in which can slide a hollow sliding rod 14 which is fixedly connected to the movable plunger part 12. The movable plunger part 12 is further provided with a radial groove 15 in which debouches a channel 16 which is arranged internally in the plunger part 12 and connects onto the internal channel of the hollow sliding rod 14.

From the starting position shown in FIG. 3A the piercing member 6 is moved into the position shown in FIG. 3B, preferably in a tangential direction along the groove 15, so that the outer end of the piercing member does not come into contact with plunger part 12. Piercing member 6 is then retracted and plunger 12 is moved upward using the fork member 5 to the position shown in FIGS. 3C and 3D. In this upward movement the tubular material M, for example of polyethylene or polyester, is also transported upward. Through the upward movement of plunger part 12 between the positions shown in FIGS. 3B and 3C, air is drawn in through the hole 19 pierced in the tube form. Clamps 21 and 22, which are movable in a manner not shown between the positions shown in FIGS. 3A, 3B, 3C and 3E on the one hand and the position shown in FIG. 3D on the other, clamp the tube form in the position shown in FIG. 3D against the cylindrical outer wall of plunger part 12. When welding members 7 and 8 respectively are moved toward each other air is thus prevented from escaping via the hole 19. In this way the air cushion C is formed, wherein a preceding hole is situated at the height of welding members 7, 8, and therefore between two successive air cushions C.

The plunger 12 is then moved downward as shown in FIG. 3E, wherein pin member 9 is also moved to support 25 in order to ensure that, after the welding members 7, 8 have moved apart, the tube form M is held in place during the return movement of plunger part 12. During this return movement of plunger part 12 air is also supplied via the hollow sliding rod 14 through channel 16 in order to prevent an underpressure occurring above plunger part 12. Subsequent to the position shown in FIG. 3E the device according to the present invention reaches the position shown in FIG. 3A and the cycle can be repeated.

During testing with the above described preferred embodiment of the present invention 50 air cushions per minute were produced with great reliability with negligible rejection of air cushions occurring and while, as will be apparent from the foregoing, no compressor was required to inject air under pressure into the tube form.

If, as will be apparent to the skilled person, use is made of compressed air to control the various components of the device, a much smaller compressor can suffice than that required for devices of the prior art, wherein this compressor also serves to supply air under pressure to an injector for injecting air into the tube form.

It will be apparent that many modifications and adaptations can be envisaged relative to the above described preferred embodiment of the present invention and the rights applied for are in no way limited by this above described preferred embodiment.

I claim:

1. A method for manufacturing one or more cushions filled with air from a piece of material having a tube form, wherein a piston member is placed into the tube form, a hole is pierced in the tube form, the piston member is moved wherein the tube form is carried along therewith and one or more weld seams are applied to the tube form.

2. The method according to claim 1, wherein during applying of the weld seams, the hole along which air can escape is clamped in a closed manner against the piston member.

3. The method according to claim 1, wherein during a return movement of the piston member the tube form is held fixedly in place.

4. A system for manufacturing one or more cushions filled with air from a piece of material having a tube form, comprising:
   a) a tube form and a piston member placed into the tube form;
   b) piercing means for piercing one or more holes in the tube form;
   c) moving means which engage onto the piston member and cause the piston member to move together with the tube form; and
   d) welding means for applying one or more weld seams in the tube form.

5. The system according to claim 4, further including claw means for clampingly closing a hole in the tube form along which air can escape while applying the weld seams.

6. The system according to claim 5, wherein the claw means comprise two clamps movable relative to each other.

7. The system according to claim 4, further including holding means for fixedly holding the tube form in place during a return movement of the piston member.

8. The system according to claim 7, wherein the holding means comprise a support and a pin member movable relative to the support.

9. The system according to claim 4, wherein the piston member comprises a plunger provided with a sliding rod in addition to a stationary part provided with an opening to allow passage of the sliding rod.

10. The system according to claim 4, wherein the moving means comprise a fork member.

* * * * *